W. E. PATRICK.
HOSE COUPLING AND HOSE FASTENER.
APPLICATION FILED JUNE 14, 1909.
1,038,948.
Patented Sept. 17, 1912.
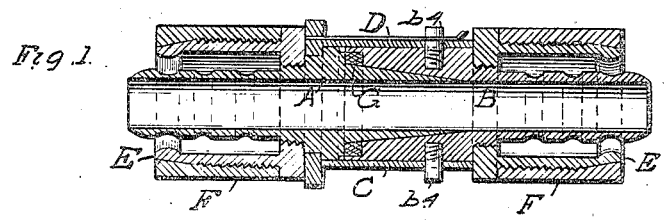
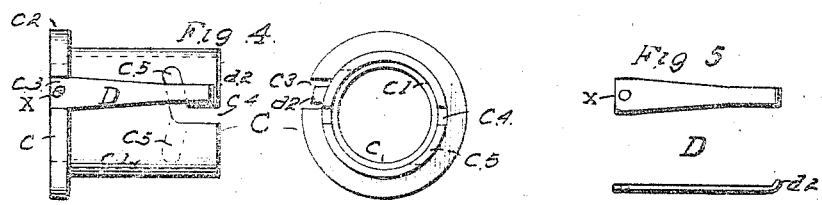
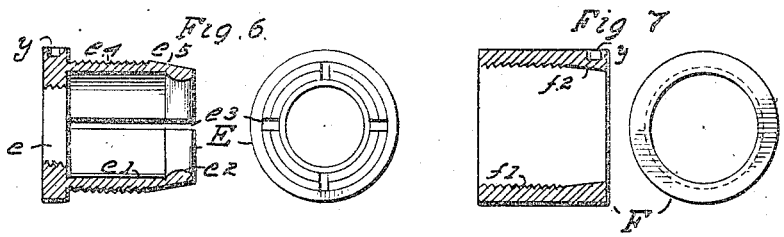
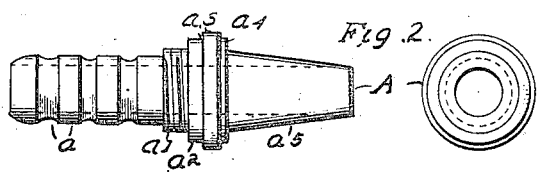
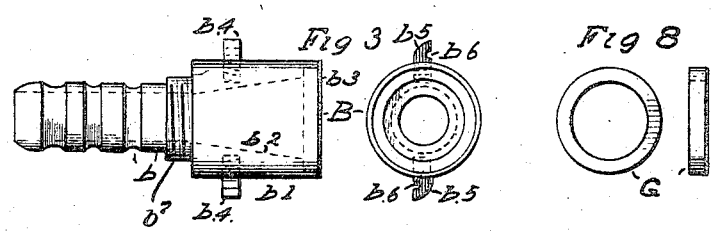
WITNESSES
INVENTOR
William E. Patrick

UNITED STATES PATENT OFFICE.

WILLIAM E. PATRICK, OF NEWPORT, RHODE ISLAND.

HOSE-COUPLING AND HOSE-FASTENER.

1,038,948.      Specification of Letters Patent.      Patented Sept. 17, 1912.

Application filed June 14, 1909. Serial No. 502,157.

*To all whom it may concern:*

Be it known that I, WILLIAM E. PATRICK, a citizen of the United States, residing at Newport, in the county of Newport and State of Rhode Island, have invented a new and useful Hose-Coupling and Hose-Fastener, of which the following is a specification.

This invention relates to improvements in hose couplings, and the object is to provide a simple and improved coupling-device by means of which a hose may be quickly and readily coupled or uncoupled and when coupled will be securely held without leaking, together with means for securing the hose to the coupler-members.

In the accompanying drawings:—Figure 1 is a longitudinal sectional view of my improved hose-coupling, the two coupler-members being shown, connected, and also the hose-clamping device; Fig. 2, a side and an end view of one of the coupler-members; Fig. 3, a side and end view of the other coupler-member; Fig. 4, a side and an end view of the locking-member of the coupling; Fig. 5, a plan and an edge view of one of the spring-members carried by the locking-member; Fig. 6, a longitudinal sectional view and an end view of the one member of the hose-clamping device, of which latter there are two; Fig. 7, a longitudinal sectional view and an end view of the other member of the hose-clamping-device; Fig. 8, illustrates the packing ring in side and face views.

Referring now more particularly to the accompanying drawing, the letter A designates the male-member of the coupling having the shank or tail-portion $a$ which is grooved or roughened and is inserted in the end of one of the sections of hose. Said male-member is formed at the forward end of the shank with a threaded shoulder $a^1$, a bearing $a^2$ for the locking-sleeve to rotate on, and an annular shoulder $a^3$. Said member A is also formed on the opposite side of shoulder $a^3$ to the bearing $a^2$ with an annular shoulder or seat $a^4$ and forward of that with a tapered plug $a^5$. A passage extends longitudinally through the entire coupler-member as shown by dotted lines, Fig. 2.

The female-member of the coupler is designated by the letter B and consists of a shank $b$ similar to the shank $a$ to fit into the end of the other hose-section. At the forward end of the shank is a threaded shoulder $b^1$ and an enlarged body $b'$ having a tapered-bore $b^2$ to receive the tapered plug $a^5$ of the male-member and an annular recess $b^3$ to receive the packing-ring G which fits over the annular-seat $a^4$ on said male-member. The enlarged body $b^2$ has on its exterior, projecting from diametrically opposite sides, locking lugs or projections $b^4$ having on one side, rounded or cam surfaces $b^5$ and on their opposite sides detents or notches $b^6$. The notches and cam-surfaces are reversed on the lugs or pins, as illustrated in Fig. 3$^a$.

C designates the locking-sleeve having an annular seat $c^1$ of a size to receive the body $b^2$ and bearing $a^2$ and having at its inner end a shoulder to abut shoulder $a^3$ of the male-member. Said locking-sleeve is formed at its outer end on opposite sides of its center with inwardly-extending straight-slots $c^4$ terminating in inclined slots $c^5$ which are disposed oppositely to each other. The two slots $c^4$ and $c^5$ form bayonet-slots one portion of which is inclined. At its inner end said sleeve is provided about its exterior with a flange $c^2$ by means of which it may be rotated, which flange may be knurled. Secured at one end by screws $x$ in slots $c^3$ formed in the knurled flange $c^2$ on opposite sides of the center of the sleeve, are spring-members D having their outer ends $d^2$ bent outwardly slightly so that they may be lifted out of engagement with the projections or lugs $b^4$. The free ends of these springs extend across the inclined slots $c^5$ at one side of slots $c^4$ in the path of said projections.

The operation of my coupling as above described is as follows:—The male-member A of the coupling is inserted in the locking-sleeve. Then the female-member B with the packing-ring in place is pushed into the locking-sleeve, over the taper-plug $a^5$ of the male-member until the packing-ring comes in contact with the shoulder $a^3$, the locking-projections $b^4$ passing through the slots $c^4$ until the slots $c^5$ are reached. The locking-sleeve is then rotated by means of the knurled flange $c^2$ until the projections come in contact with the inclined walls of the slots $c^5$, and as the rotation of the sleeve is continued the springs D come in contact with the inclined or cam sides of the projections or lugs which effect the raising of said springs until said lugs pass. The springs then return to normal position and are engaged by the notches $b^6$ of said lugs, thus preventing rotation of the sleeve in a reverse direction until the springs are disengaged manually from the notches. As the sleeve is rotated, the coaction of the projections or lugs with the inclined walls of the slots $c^5$, forces the coupler members together, making a tight joint at the packing-ring G and holding said members securely.

The clamping device, of which two are employed, one for each coupler-member, consists of a sleeve E having a threaded opening $e$ at one end to fit the threaded shoulder $a^1$ of the coupler-member A or the similar shoulder of coupler-member B. The body of the sleeve is exteriorly screw-threaded at $e^4$ and is split to form yielding clamping sections or jaws $e^1$, which are compressed by a nut F which is interiorly screw-threaded at $f^1$ to take the threads of the sleeve. The nut at one end on its interior is formed with a tapered portion $f^2$ which when the nut is screwed on the sleeve comes in contact with the tapered exterior portion $e^5$ at one end of the sleeve and forces the lips $e^2$ formed on the inner sides of the clamping jaws into the hose and compresses the latter into the shank of the coupler-member. Both the sleeve and nut are formed with holes $y$ for a spanner wrench.

Having thus fully described my invention what I claim as new and desire to secure by Letters Patent of the United States, is:—

1. A hose coupling comprising a female section having a bayonet slot in one end thereof, a male section provided with a laterally extending lug member adapted to engage in the bayonet slot and a spring member disposed across said slot and extending longitudinally of said female section, said lug member and said spring member coacting to lock the sections in assembled relation, one of said members being provided with a cam surface.

2. A hose coupling comprising abutting members, a plurality of pins on one member having cam surfaces on one side and notches on the other side, the other of said members having bayonet slots for said pins, and outwardly yielding members extending across said bayonet slots and adapted to be moved out of the path of the pins when the abutting members are given relative rotation in one direction, by engagement of the cam surfaces of the pins therewith, and on rotation in the opposite direction to be engaged by the notches of said pins.

3. A hose coupling comprising a male member, a female member, and a sleeve for inclosing the abutting ends of said members and having bayonet slots formed therein, means for maintaining said sleeve on one of said members, pins on the other of said members adapted to work in said bayonet slots to draw the members together, and outwardly yielding members extending across said slots, said pins having entering sides cam-shaped and the opposite sides notched said yielding members adapted to be moved out of the path of the pins when the abutting members are given relative rotation in one direction, by engagement of the pins therewith and on rotation in the opposite direction to be engaged by the notches of the pins.

4. A hose coupling comprising abutting members, a plurality of pins on one member having cam surfaces on one side, the other of said members having bayonet slots for said pins, and outwardly yielding members extending substantially lengthwise of the abutting members and across said bayonet slots.

WILLIAM E. PATRICK.

Witnesses:
 MAX LEVY,
 GEORGE J. SCHOENEMAN.